(12) United States Patent
Cai

(10) Patent No.: US 12,241,906 B2
(45) Date of Patent: Mar. 4, 2025

(54) LABORATORY SAMPLE DISTRIBUTION SYSTEM

(71) Applicant: Roche Diagnostics Operations, Inc., Indianapolis, IN (US)

(72) Inventor: Yin Cai, Munich (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 227 days.

(21) Appl. No.: 17/444,059

(22) Filed: Jul. 30, 2021

(65) Prior Publication Data

US 2022/0057420 A1 Feb. 24, 2022

(30) Foreign Application Priority Data

Aug. 19, 2020 (EP) ..................................... 20191698

(51) Int. Cl.
*G01N 35/04* (2006.01)
*B65G 54/02* (2006.01)

(52) U.S. Cl.
CPC .............. *G01N 35/04* (2013.01); *B65G 54/02* (2013.01); *B65G 2201/0261* (2013.01);
(Continued)

(58) Field of Classification Search
CPC ........... G01N 35/04; G01N 2035/0406; G01N 2035/0418; G01N 2035/0477;
(Continued)

(56) References Cited

U.S. PATENT DOCUMENTS

| 5,454,328 | A  | * | 10/1995 | Matsuzaki | ............. | B65G 54/02 |
|||||||105/156|
| 2001/0030606 | A1 | * | 10/2001 | Jaffe | ..................... | F25D 23/021 |
|||||||340/545.6|

(Continued)

FOREIGN PATENT DOCUMENTS

| EP | 3112875 A1 * | 1/2017 |
| EP | 3410123 A1 | 12/2018 |

(Continued)

OTHER PUBLICATIONS

European Search Report issued Jan. 29, 2021, in Application No. 20191698.8, 2 pp.

*Primary Examiner* — P. Kathryn Wright
*Assistant Examiner* — Curtis A Thompson
(74) *Attorney, Agent, or Firm* — Woodard, Emhardt, Henry, Reeves & Wagner, LLP

(57) ABSTRACT

A laboratory sample distribution system is provided comprising a number of sample container carriers and a number of transport modules, wherein each transport module comprises: a transport surface, wherein the transport modules are arrangeable adjacent to one another in a row-direction and in a column-direction such that the transport surfaces of the transport modules together form a common transport surface, and controllable drive means being arranged below the transport surface and being adapted to move sample container carriers on top of the transport surface, wherein at least some transport modules of the number of transport modules are movable transport modules being adapted to be moved during operation of the laboratory sample distribution system such that a gap is formed between transport modules arranged in row-direction and/or column-direction or that a gap is closed between transport modules arranged in row-direction and/or column-direction.

15 Claims, 7 Drawing Sheets

(52) U.S. Cl.
CPC ............... *G01N 2035/0406* (2013.01); *G01N 2035/0418* (2013.01); *G01N 2035/0477* (2013.01)

(58) Field of Classification Search
CPC . G01N 2035/00326; G01N 2035/0472; G01N 2035/0489; G01N 2035/046; B65G 54/02; B65G 2201/0261
See application file for complete search history.

(56) References Cited

U.S. PATENT DOCUMENTS

| | | | |
|---|---|---|---|
| 2002/0146347 A1* | 10/2002 | McNeil | G05D 1/0291 |
| | | | 422/65 |
| 2003/0044319 A1 | 3/2003 | Itoh | |
| 2005/0265896 A1 | 12/2005 | Ttoh | |
| 2008/0053790 A1* | 3/2008 | Itoh | G01N 35/04 |
| | | | 211/13.1 |
| 2009/0249699 A1* | 10/2009 | Yulkowski | E05F 15/70 |
| | | | 49/349 |
| 2014/0231217 A1* | 8/2014 | Denninger | G01N 35/00584 |
| | | | 198/619 |
| 2018/0210000 A1* | 7/2018 | van Mierlo | G01N 35/04 |
| 2018/0348244 A1* | 12/2018 | Ren | G01N 35/04 |
| 2019/0077007 A1* | 3/2019 | Mallinson | A61B 5/1118 |
| 2019/0242916 A1 | 8/2019 | Guarracina et al. | |
| 2020/0348324 A1* | 11/2020 | Wikholm | G05D 1/0246 |

FOREIGN PATENT DOCUMENTS

| | | | |
|---|---|---|---|
| EP | 3428653 A1 | 1/2019 | |
| JP | H06-183547 A | 7/1994 | |
| JP | H07-077530 A | 3/1995 | |
| JP | H07-234229 A | 9/1995 | |
| JP | 2005-118246 A | 5/2005 | |
| JP | 2008-058202 A | 3/2008 | |
| WO | WO-2019139930 A1 * | 7/2019 | ............ B01L 3/5085 |

* cited by examiner

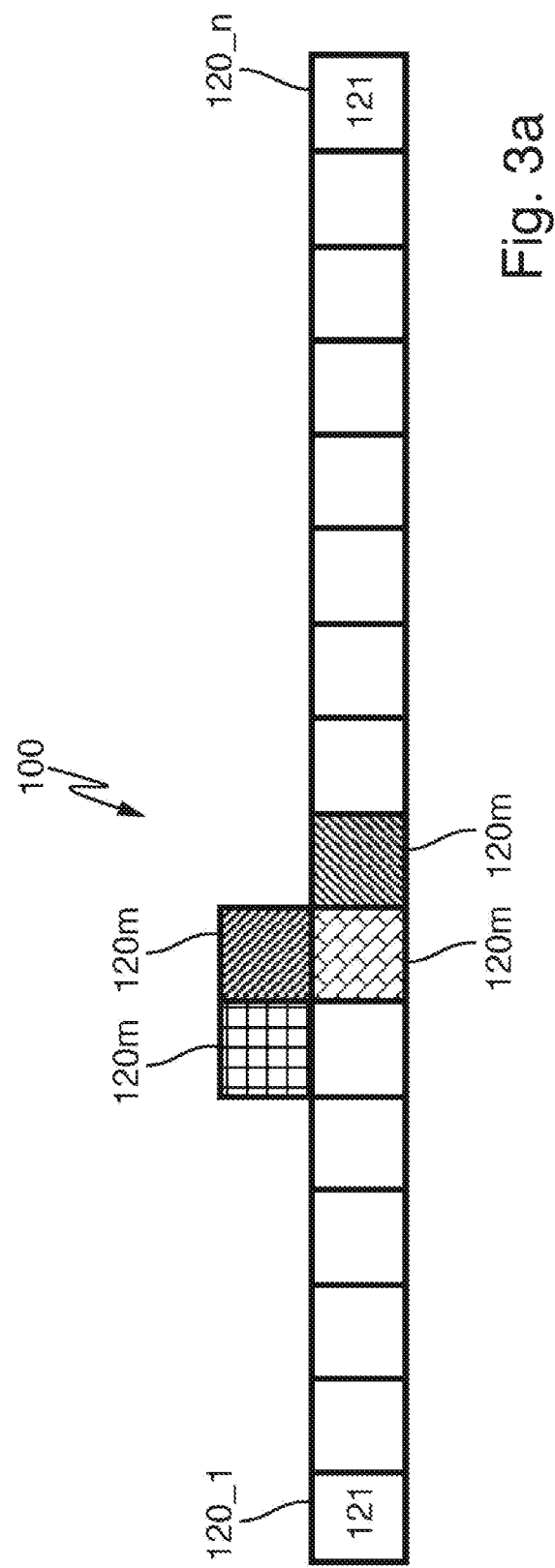

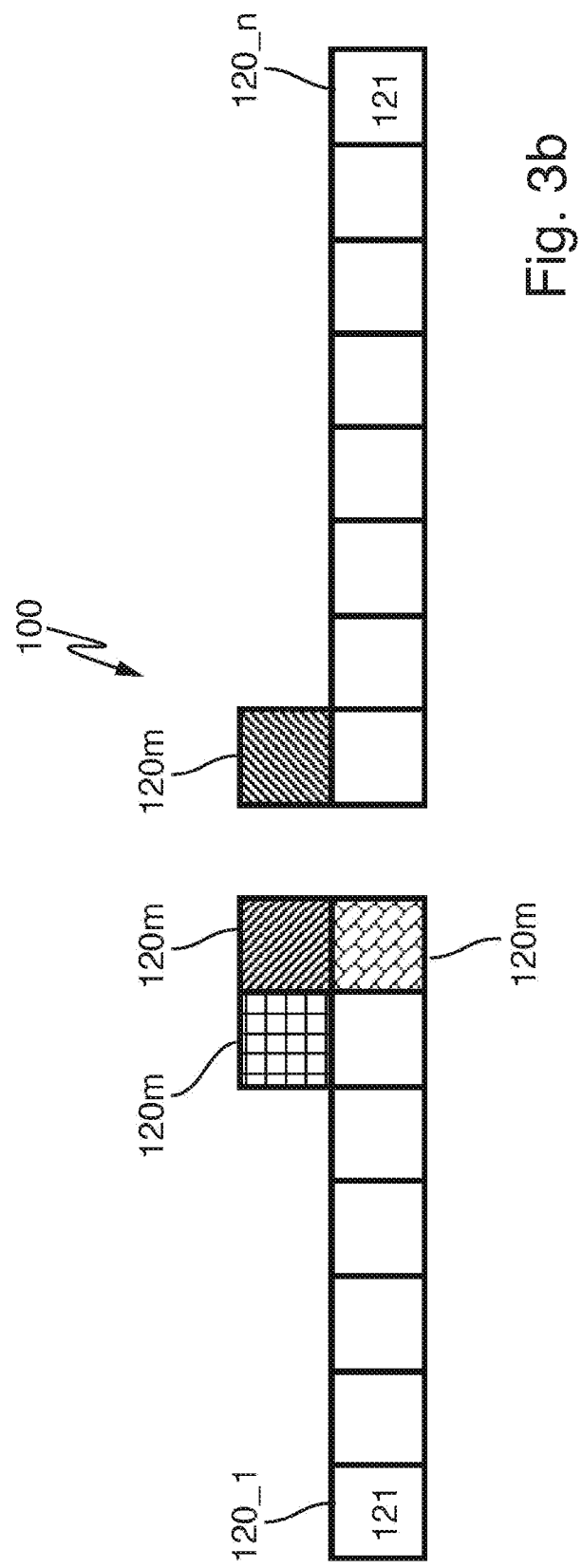

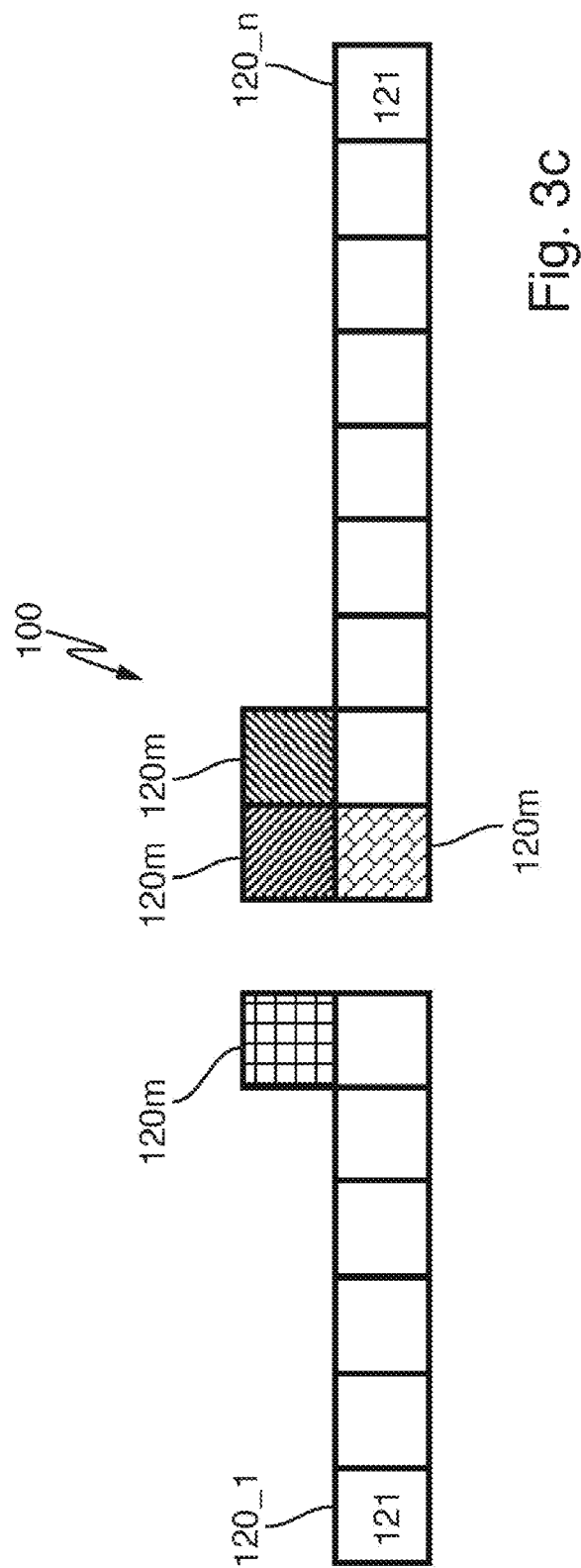

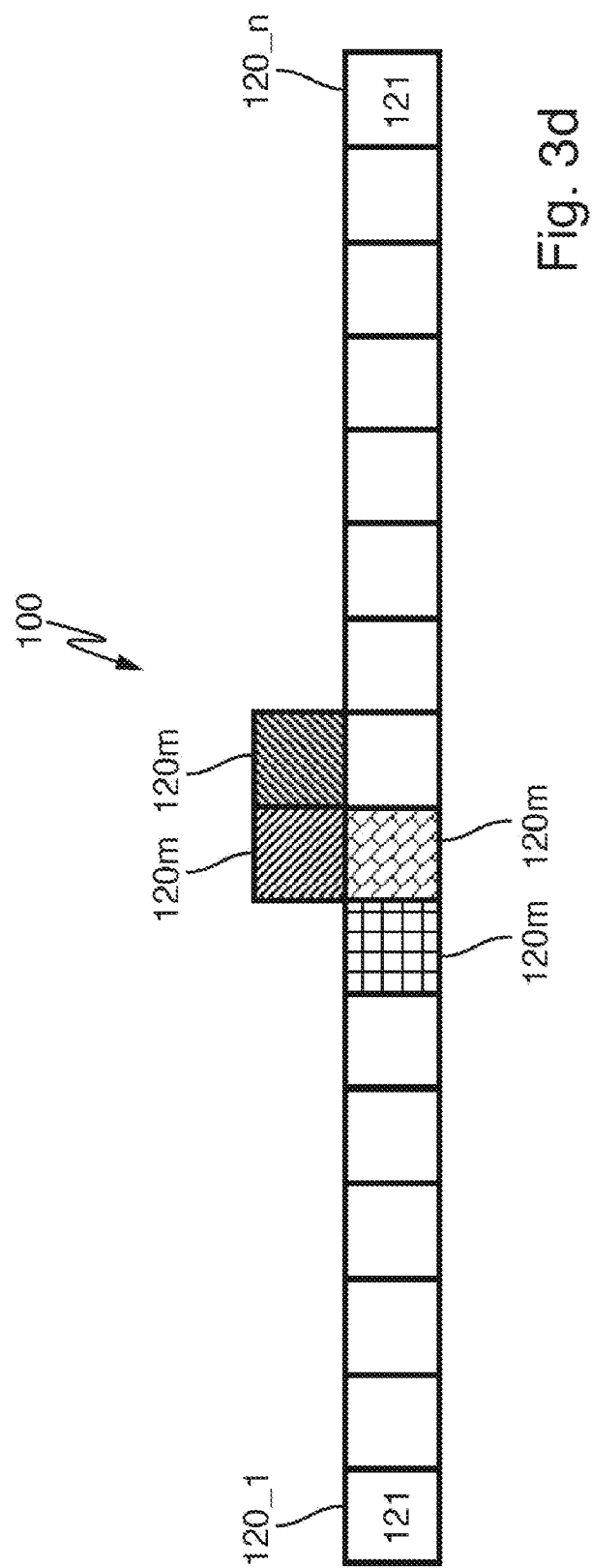

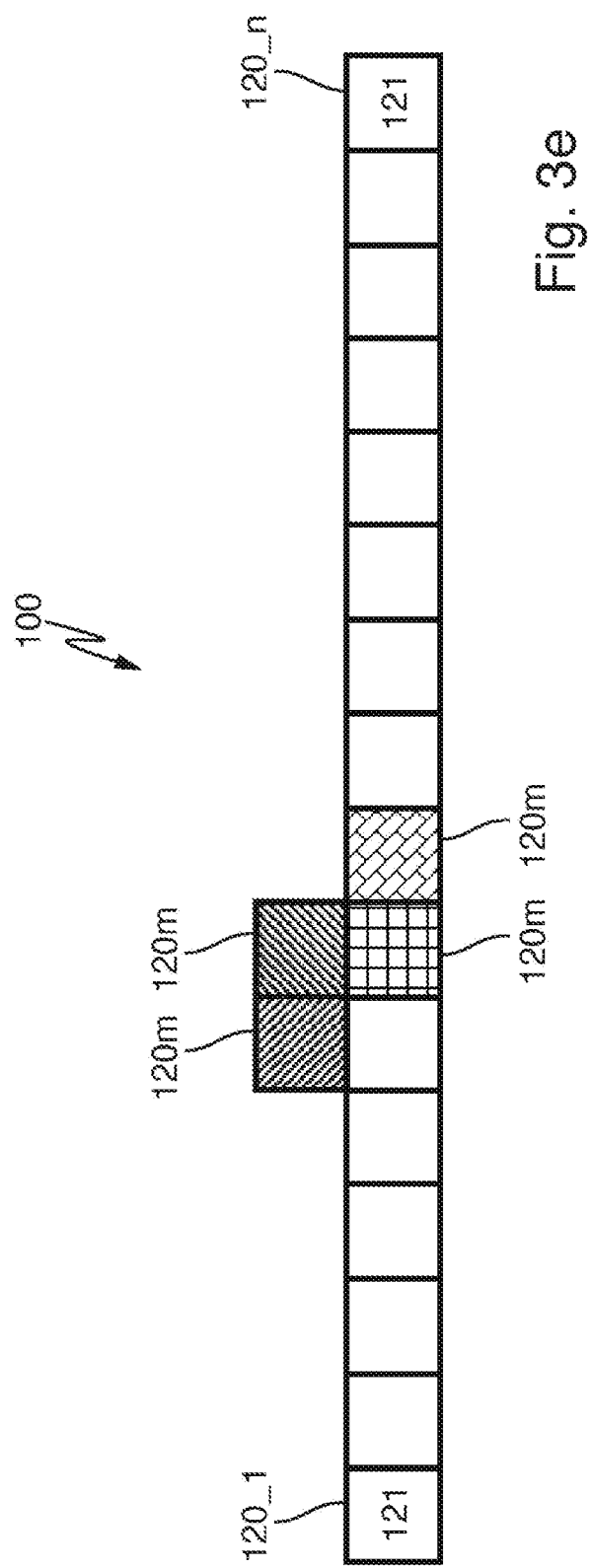

LABORATORY SAMPLE DISTRIBUTION SYSTEM

CROSS-REFERENCE TO RELATED APPLICATIONS

This application claims priority to European Patent Application No. 20191698.8, filed 19 Aug. 2020, the disclosure of which is hereby incorporated by reference in its entirety.

TECHNICAL FIELD

The present disclosure relates to a laboratory sample distribution system.

SUMMARY

A laboratory sample distribution system is herein introduced. Although the embodiments of the present disclosure are not limited to specific advantages or functionality, the disclosure provides for a laboratory sample distribution system being easily accessible even if a large common transport surface is formed.

In accordance with one embodiment of the disclosure, a laboratory sample distribution system is provided comprising a number of sample container carriers, and a number of transport modules, wherein each transport module comprises: a transport surface, wherein the transport modules are arrangeable adjacent to one another in a row-direction and in a column-direction such that the transport surfaces of the transport modules together form a common transport surface, and controllable drive means being arranged below the transport surface and being adapted to move sample container carriers on top of the transport surface, characterized in that at least some transport modules of the number of transport modules are movable transport modules being adapted to be moved during operation of the laboratory sample distribution system such that a gap is formed between transport modules arranged in row-direction and/or column-direction or that a gap is closed between transport modules arranged in row-direction and/or column-direction.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which:

FIGS. 3a-3e show a laboratory sample distribution system according to another embodiment of the disclosure in different states of forming and closing a gap in a common transport surface.

Figure 1:
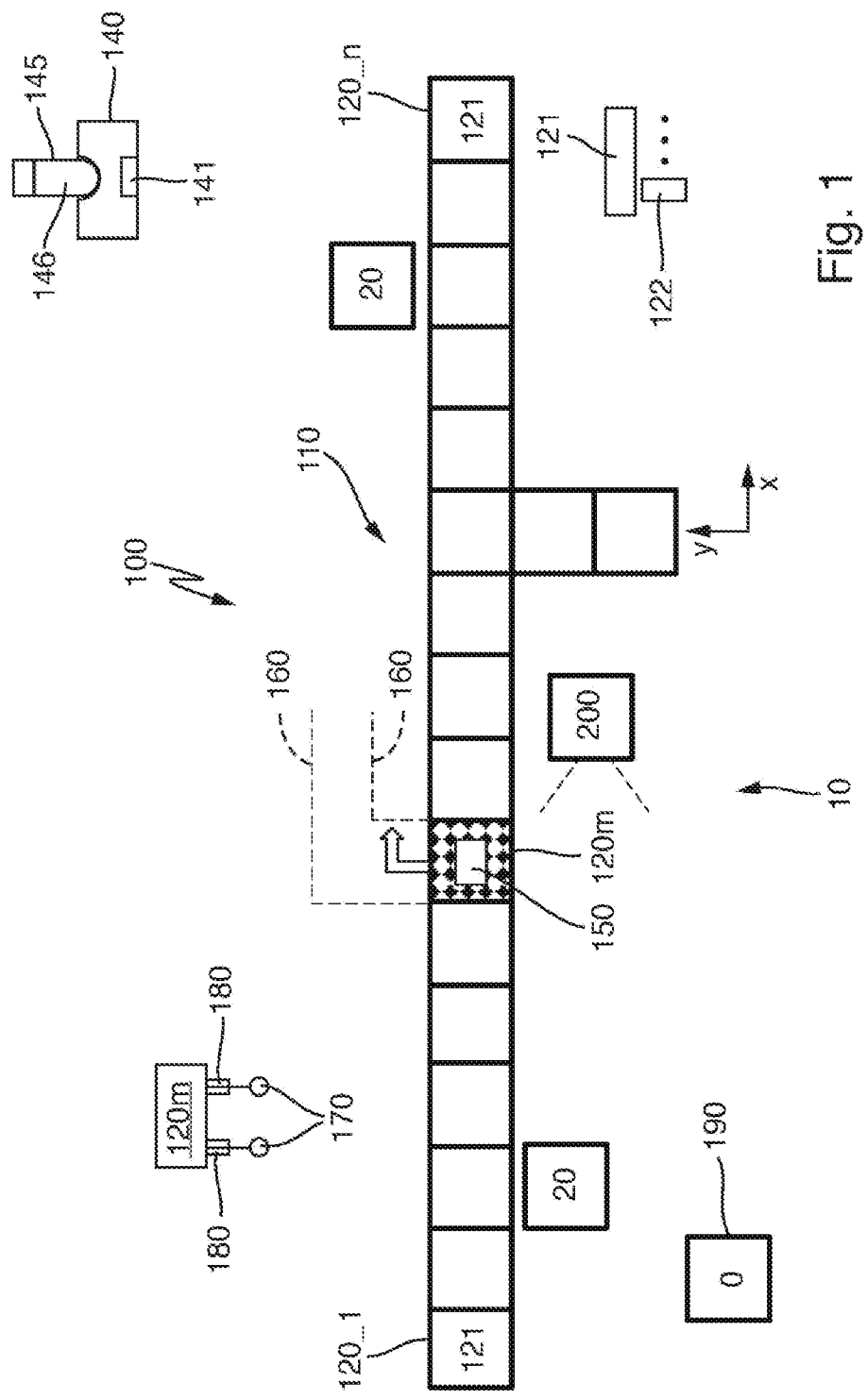
FIG. 1 shows a laboratory automation system comprising a laboratory sample distribution system according to an embodiment of the disclosure, wherein the laboratory sample distribution system is in a first state without a gap in a common transport surface.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

The laboratory sample distribution system comprises a number (e.g., 2 to 2000) of sample container carriers being adapted to carry a sample container, typically a sample tube comprising a medical sample.

The laboratory sample distribution system further comprises a number, e.g., between 2 and 1000, of transport modules.

Each transport module comprises a transport surface (may also be denoted as transport plane), wherein the transport modules are arrangeable adjacent to one another in a row-direction and in a column-direction such that the transport surfaces of the transport modules together form a common transport surface used to distribute sample container carriers over long distances, e.g., 50 meters.

Each transport module further comprises controllable drive means being arranged below the transport surface and being adapted to move sample container carriers on top of the transport surface. The controllable drive means may, e.g., be embodied in form of electromagnets or solenoids, being arranged below the respective transport surface in rows (row-direction) and columns (column-direction) and being adapted to move sample container carriers on/over the respective transport surface. Each sample container carrier may comprise a magnetically active device, e.g., in form of a permanent magnet being positioned inside the respective sample container carrier. The magnetically active device or permanent magnet may be adapted to interact with magnetic fields generated by the drive means or electromagnets, such that a magnetic force to the magnetically active device is caused. Consequently, the sample container carriers may be moved on top of the transport surfaces independently from one another along individual or common transport paths.

At least some transport modules of the number of transport modules are embodied as movable transport modules being adapted to be, in particular horizontally, moved during operation of the laboratory sample distribution system such that a gap is formed between transport modules arranged adjacent to one another in row-direction and/or column-direction or that a gap is closed between transport modules arranged adjacent to one another in row-direction and/or column-direction. In other words, the movable transport modules are adapted to be moved during operation of the laboratory sample distribution system such that the gap is formed or closed in the common transport plane. All transport modules of the number of transport modules may be embodied as movable transport modules or only some of the transport modules of the number of transport modules may be embodied as movable transport modules and the remaining transport modules may be embodied as non-movable transport modules.

In large laboratories the common transport surface may extend over a large area in a complex layout, e.g., in a so called butterfly layout. If a user needs to go, e.g., from the left half to the right half, the user needs to go around the "head" or "tail" area of the butterfly layout. This can result in long paths to be travelled. The disclosure provides a mechanism that allows a user to pass "through" the common transport surface by providing a gap at the necessary location.

According to an embodiment the laboratory sample distribution system further comprises an actuator being adapted to cause a movement of the movable transport modules. The actuator may, e.g., be embodied as an electric motor.

According to an embodiment the laboratory sample distribution system further comprises a guidance, e.g., in form of rails, guiding the movable transport modules in row-direction and/or in column-direction.

According to an embodiment the movable transport modules comprise wheels, e.g., electrically driven wheels.

According to an embodiment the movable transport modules comprise shock absorbers being adapted to prevent that shocks are acted on the transport surface of a movable transport module during movement of the movable transport module.

According to an embodiment the laboratory sample distribution system further comprises a user operable control unit, e.g., a push button arranged close to a gap to be provided, being adapted to initiate a movement of the movable transport modules such that the gap is formed or closed when the control unit is operated.

According to an embodiment the laboratory sample distribution system further comprises a proximity sensor being adapted to initiate a movement of the movable transport modules such that the gap is formed when sensing a user in proximity to the transport modules arranged in row-direction and/or column-direction.

According to an embodiment the laboratory sample distribution system comprises a plurality of movable transport modules, wherein during operation of the laboratory sample distribution system the plurality of movable transport modules are adapted to be moved in a predefined sequence such that the gap is formed and/or closed.

According to the disclosure moveable transport modules are provided. These transport modules can be connected such that multiple transport modules move together. The size of the connected transport modules can differ and be configured based on the laboratory layout, size of the desired gap, etc. By moving the transport modules, a gate or gap can be introduced in the common transport surface.

The movable transport modules may have wheels on a bottom side and may move controlled on a laboratory floor. The movement might also be controlled via a guidance or rail system arranged below the respective movable transport modules, such that the movable transport modules may move without directly moving on the laboratory floor.

The movement of the movable transport modules may be controlled in a pre-defined trajectory and sequence and may be synchronized with the movement of the sample container carriers placed on the transport surface of a respective movable transport module.

The movable transport modules may comprise shock absorbers, e.g., placed in a frame of the movable transport modules and, e.g., be embodied as springs to reduce a vertical vibration of the transport surface.

The forming/closing of the gap may be triggered by a user in the laboratory by, e.g., pushing a button, indicating that the user wants to cross the common transport surface.

The moveable transport modules may be controlled by a control unit such that sample container carriers may freely move between the non-movable transport modules and the moveable transport modules.

When a movement of the movable transport modules is initiated, the movement of the sample container carriers may follow the rule: either the sample container carriers move from one transport module to the next transport module or the transport module moves and all sample container carriers placed on that transport module do not move, and may, e.g., be fixed by controlling the corresponding drive means.

If a gap is caused and closed again, it is possible to avoid processing time gaps, to avoid system standby, to avoid throughput lost, to avoid changing in samples transport order, and to avoid extended distance to travel by defining the moving sequence and pattern of the movable transport modules and of the sample container carriers.

In order that the embodiments of the present disclosure may be more readily understood, reference is made to the following examples, which are intended to illustrate the disclosure, but not limit the scope thereof.

FIG. 1 shows a top view laboratory automation system 10 comprising a laboratory sample distribution system 100 and two laboratory stations 20, which may be embodied as pre-analytical, analytical and/or post-analytical stations 20. The stations 20 are arranged adjacent to the laboratory sample distribution system 100. Self-evidently, more than the two stations 20 depicted in FIG. 1 may be comprised in the laboratory automation system 10.

The laboratory sample distribution system 100 comprises a number n of 16 transport modules 120_1 to 120_$n$ positioned adjacent to each other in a row-direction x and some of the transport modules 120_1 to 120_$n$ positioned adjacent to each other in a column-direction y. The transport modules 120 respectively comprise transport surfaces 121 forming a common transport surface 110.

Under a respective transport surface 121 a plurality of electrically controllable drive means or electro-magnetic actuators in form of electromagnets 122 (side view) are positioned in rows and columns. The drive means 122 are implemented as solenoids having a solid ferromagnetic core and a coil surrounding the ferromagnetic core.

Sample container carriers 140 are positioned on the common transport surface 110 and can be moved by means of the drive means 122. While it should be understood that a plurality of sample container carriers 140 can be positioned on the common transport surface 110, due to simplicity only one exemplary sample container carrier 140 is depicted in FIG. 1 in a schematic side view. The sample container carrier 140 holds a sample container 145, in which a sample to 146 be analyzed is contained.

A respective sample container carrier 140 comprises a magnetically active device 141 in form of a permanent magnet being positioned inside the respective sample container carrier 140. The magnetically active device 141 or permanent magnet is adapted to interact with electro-magnetic fields generated by the drive means 122 for moving the sample container carrier 140 over the common transport surface 110.

The laboratory sample distribution system 100 is adapted to transport the sample container carriers 140 and/or the sample containers 145 between the laboratory stations 20. The laboratory stations 20 are positioned adjacent to the transport surface 110 such that a sample container carrier 140 can be used to transport a sample contained in the sample container 145 to a respective laboratory station 20.

The transport modules 120 typically have the same size and may, e.g., comprise a matrix of 6×6 drive means 122.

Regarding the aspects being described insofar, reference is also made, e.g., to European Patent No. EP 3 428 653 A1, the disclosure of which is hereby incorporated herein by reference.

Figure 2:
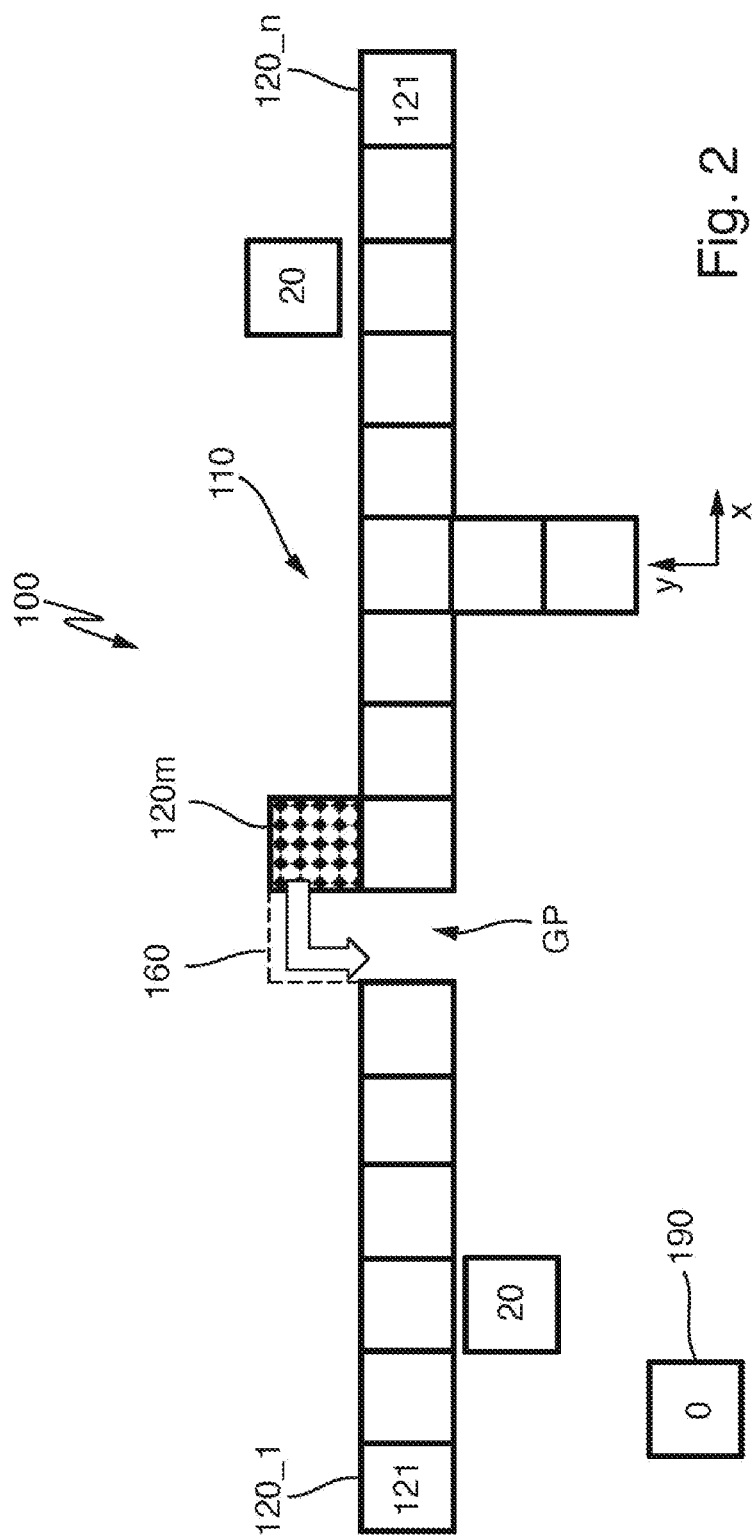
FIG. 2 shows the laboratory sample distribution system of FIG. 1 in a second state with a gap in the common transport surface.

One of the transport modules is embodied as a movable transport module 120*m* being adapted to be moved during operation of the laboratory sample distribution system 100 such that a gap GP, see FIG. 2, is formed or closed between transport modules 120_1 to 120_*n*. FIG. 1 shows the laboratory sample distribution system 10 in a first state, wherein no gap is formed in the common transport surface 110.

FIG. 2 shows the laboratory sample distribution system 10 of FIG. 1 in a second state, wherein a gap GP is formed in the common transport surface 110. The gap GP is dimensioned such that a user may walk through the gap GP from one side to the other side of the common transport surface 110. For simplicity of illustration, FIG. 2 only depicts the laboratory sample distribution system 100.

In order to cause a movement of the movable transport module 120*m* an actuator 150 is provided, wherein the actuator 150 (FIG. 1) may, e.g., be embodied as an electric motor.

To guide the movable transport module 120*m* along a desired path, a guidance 160 guiding the movable transport module 120*m* is provided, e.g., being embodied as rails.

The movable transport module 120*m* may comprise electrically driven wheels 170 being guided in the guidance or rails 160.

The movable transport module 120*m* comprises shock absorbers 180 being adapted to prevent that shocks are acted on the transport surface 121 of the movable transport module 120*m* during movement of the movable transport module 120*m*. The shock absorbers 180 may, e.g., be embodied as damped springs.

The laboratory sample distribution system 100 further comprises a user operable control unit 190 being embodied as a push button being adapted to initiate a movement of the movable transport module 120*m* such that the gap GP is formed or closed when the control unit 190 is operated.

The laboratory sample distribution system 100 further comprises a proximity sensor 200 being adapted to initiate a movement of the movable transport module 120*m* such that the gap GP is formed when sensing a user in proximity to the transport modules 120_1 to 120_*n*.

FIGS. 3*a* to 3*e* show a laboratory sample distribution system 100 according to another embodiment of the disclosure in different states of forming and closing a gap GP in the common transport surface 110. The hachures are used to track individual movable transport modules 120*m*.

The laboratory sample distribution system 100 may be used in a laboratory automation system as depicted in FIG. 1.

The laboratory sample distribution system 100 comprises a plurality of movable transport modules 120*m* being adapted to be moved in a predefined sequence such that the gap GP is formed, shifted and closed again.

As disclosed in the sequence, one or more movable transport modules 120*m* may be moved simultaneously.

The basic topology disclosed in FIG. 3*a* representing the start of the sequence and FIG. 3*e* representing the end of the sequence is the same. Nevertheless, some of the movable transport modules 120*m* have swapped their position.

What is claimed is:

1. A laboratory sample distribution system, comprising:
    a number of sample container carriers;
    a number of transport modules, wherein each transport module comprises a transport surface, wherein the number of transport modules are arranged adjacent to one another in a row-direction and/or in a column-direction such that the transport surfaces of transport modules arranged adjacent to one another together form a common transport surface,
    each of the number of transport modules further comprises a controllable drive means arranged below the transport surface and adapted to move the sample container carriers on top of the common transport surface,
    at least some transport modules of the number of transport modules are movable transport modules adapted to be moved during operation of the laboratory sample distribution system such that:
        a gap is formed between transport modules arranged in the row-direction and/or the column-direction, and/or
        a gap is closed between transport modules arranged in the row-direction and/or the column-direction; and
    a proximity sensor sensing a user in proximity to the transport modules and in response initiating a movement of the movable transport modules and thereby forming the gap in the transport modules sufficient for the user to pass therethrough.

2. The laboratory sample distribution system according to claim 1, wherein the laboratory sample distribution system further comprises an actuator being adapted to cause a movement of the movable transport modules.

3. The laboratory sample distribution system according to claim 1, wherein the laboratory sample distribution system further comprises a guidance guiding the movable transport modules.

4. The laboratory sample distribution system according to claim 1, wherein the movable transport modules comprise wheels.

5. The laboratory sample distribution system according to claim 4, wherein the wheels are electrically driven.

6. The laboratory sample distribution system according to claim 1, wherein the movable transport modules comprise shock absorbers being adapted to prevent that shocks are acted on the transport surfaces of the movable transport modules during movement of the movable transport module.

7. The laboratory sample distribution system according to claim 1, wherein the laboratory sample distribution system further comprises a control unit being adapted to initiate a movement of the movable transport modules such that the gap is formed or the gap is closed when the control unit is operated.

8. The laboratory sample distribution system according to claim 1, wherein during operation of the laboratory sample distribution system the movable transport modules are adapted to be moved in a predefined sequence such that the gap is formed or the gap is closed.

9. The laboratory sample distribution system according to claim 1 wherein:
    the movement is in a plane including the row-direction and the column-direction, and
    the movement is first away from and in a different direction from a transport path of the sample container carriers moved by the number of transport modules, and after that, the movement is in a direction substantially parallel to the transport path.

10. The laboratory sample distribution system according to claim 1 comprising a movable transport module in a line between two adjacent transport modules, the proximity sensor:

moving a first movable transport module in a direction perpendicular to the line of transport modules to form the gap between the two adjacent transport modules, and thereafter moving the first movable transport module in a direction parallel to the line of transport modules to unblock the gap between the line of transport modules.

11. The laboratory sample distribution system according to claim 10 wherein:

the movement is in a plane including the row-direction and the column-direction, the movement is away from and in a different direction from a transport path of the sample container carriers moved by the number of transport modules, and after that, the movement is in a direction substantially parallel to the transport path.

12. A laboratory sample distribution system, comprising:
a number of sample container carriers;
a number of transport modules, each transport module comprising:
a transport surface, and
controllable drive means arranged below the transport surface and adapted to move the sample container carriers on top of the transport surface,
wherein the transport modules are arranged adjacent to one another in a row-direction and/or in a column-direction, and the transport surfaces of the transport modules arranged adjacent to one another forming a common transport surface, and
wherein at least some transport modules of the number of transport modules are movable transport modules adapted to be moved during operation of the laboratory sample distribution system such that:
a gap is formed between transport modules arranged in the row-direction and/or the column-direction, and/or
a gap is closed between transport modules arranged in the row-direction and/or the column-direction; and
a proximity sensor sensing a user in proximity to the transport modules and in response initiating a movement of at least one of the movable transport modules thereby forming the gap in the transport modules sufficient for the user to pass therethrough.

13. The laboratory sample distribution system according to claim 12 wherein:

the movement is in a plane including the row-direction and the column-direction, the movement is away from and in a different direction from a transport path of the sample container carriers moved by the number of transport modules, and after that, the movement is in a direction substantially parallel to the transport path.

14. The laboratory sample distribution system according to claim 12 comprising a movable transport module in a line between two adjacent transport modules, the proximity sensor:

moving a first movable transport module in a direction perpendicular to the line of transport modules to form the gap between the two adjacent transport modules, and thereafter moving the first movable transport module in a direction parallel to the line of transport modules to unblock the gap between the line of transport modules.

15. The laboratory sample distribution system according to claim 14 wherein:

the movement is in a plane including the row-direction and the column-direction, the movement is away from and in a different direction from a transport path of the sample container carriers moved by the number of transport modules, and after that, the movement is in a direction substantially parallel to the transport path.

* * * * *